United States Patent [19]

Shinoda

[11] Patent Number: 5,960,396
[45] Date of Patent: Sep. 28, 1999

[54] STANDARD PATTERN PRODUCTION SYSTEM EMPLOYING INFORMATION CRITERION

[75] Inventor: Koichi Shinoda, Tokyo, Japan

[73] Assignee: NEC Corporation, Tokyo, Japan

[21] Appl. No.: 08/845,234

[22] Filed: Apr. 21, 1997

[30] Foreign Application Priority Data

Apr. 19, 1996 [JP] Japan .................................. 8-122758

[51] Int. Cl.⁶ ..................................................... G10L 5/04
[52] U.S. Cl. ......................... 704/243; 704/244; 704/245; 704/246
[58] Field of Search ................................... 704/243, 244, 704/245, 256

[56] References Cited

U.S. PATENT DOCUMENTS

| | | | |
|---|---|---|---|
| 4,817,159 | 3/1989 | Hoshimi et al. ........................ | 704/231 |
| 4,991,216 | 2/1991 | Fujii ........................................ | 704/231 |
| 5,131,043 | 7/1992 | Fujii et al. .............................. | 704/243 |
| 5,199,080 | 3/1993 | Kimura et al. .......................... | 704/243 |
| 5,390,280 | 2/1995 | Kato et al. .............................. | 704/275 |
| 5,561,722 | 10/1996 | Watari et al. ........................... | 704/243 |

FOREIGN PATENT DOCUMENTS

| | | |
|---|---|---|
| 0 387 602 | 9/1990 | European Pat. Off. . |
| 0 615 227 A2 | 9/1994 | European Pat. Off. . |

OTHER PUBLICATIONS

Denshi Joho Tsushin Gakkai Gijutsu Kenkyu Hokoku (Onsei) [Technical Research Reports of the Society of Communication of Electronic Information (Audio) SP93–26, pp. 17–24 (Jun. 1993).

Denshi Joho Tsushin Gakkai Gijutsu Kenkyu Hokoku (Onsei) [Techinical Research Reports of the Society of Communication of Electronic Information (Audio) SP93–25, pp. 9–16 (Jun. 1993).

Richimura N: "Robust Clustering Based on a Maximum–Likelihood Method for Estimating a Suitable Number of Clusters" Systems and Computers in Japan, vol. 28, No. 1, Jan., 1997, pp. 10–23; Translated from Vo. J78–D–II, No. 8, Aug. 1995, pp. 1184–1195.

Ristad, Thomas: "Context Models in the MDL Framework" Data Compression Conference Proceedings, Dcc'95., Mar. 28–30, pp. 62–71.

Han Tesun, et al., "Applied Mathematics II of the Iwanami Lecture, Mathematics of Information and Coding," *Iwanami Book Store*, 1994, pp. 249–275.

Hirotugu Akaike, "A New Look at the Statistical Model Identification", *IEEE Transactions on Automatic Control*, vol. AC–19, No. 6, 1974, pp. 716–723.

Hirotugu Akaike, "What is an Information Criterion"?, pp. 5–11, 1976.

L. Rabiner et al., "Fundamentals of Speech Recognition", Prentice Hall, Chapter 6, pp. 321–389.

S.J. Young et al., "Tree–Based State Tying for High Accuracy Acoustic Modelling", Proc. of Human Language Technology, 1994, pp. 307–312.

*Primary Examiner*—David R. Hudspeth
*Assistant Examiner*—Daniel Abebe
*Attorney, Agent, or Firm*—Foley & Lardner

[57] ABSTRACT

The invention provides a standard pattern production system which produces an optimum recognition unit in terms of an information criterion to given learning data using an information criterion in learning of a standard pattern in pattern recognition. An input pattern production section holds an input pattern, and a standard pattern producing parameter production section calculates and outputs parameters necessary to produce standard patterns of individual categories. A cluster set production section divides a category set into cluster sets. A common standard pattern production section calculates standard patterns of individual clusters of the cluster sets. An optimum cluster selection section receives a plurality of cluster sets and common standard patterns and selects an optimum cluster using an information criterion. A standard pattern storage section stores the common standard pattern of the optimum cluster set as a standard pattern for the individual categories.

10 Claims, 3 Drawing Sheets

FIG. 2

FIG. 3

STANDARD PATTERN PRODUCTION SYSTEM EMPLOYING INFORMATION CRITERION

BACKGROUND OF THE INVENTION

1. Field of the Invention

This invention relates to a pattern production system for pattern recognition, and more particularly to a standard pattern production system for a speech recognition system which employs a standard pattern and another speech recognition system which employs a HMM of the continuous mixture distribution model type.

2. Description of the Related Art

In recent years, investigations for mechanical recognition of speech patterns have been conducted and various methods have been proposed. A representative one of the methods which is used popularly employs a hidden Markov model (HMM).

As a speech recognition system which employs a HMM, a recognition system for a non-particular speaker by which voice of any person can be discriminated is investigated and developed energetically. In a method which employs a HMM, a transition diagram (Markov model) which includes a small number of states is produced for each word or each phoneme, and it is checked and recognized from which one of the models input voice is produced most likely. Since what is observed then is a spectrum sequence produced by transition and the state itself is not observed, it is called "hidden". For each of the models, occurrence probabilities of a spectrum parameter in various states and transition probabilities between the states are estimated using learning samples in advance, and then, upon recognition, input voice is mapped with the models and that one of the models which is most likely to produce the input voice is selected and outputted as a result of recognition.

Figure 1:
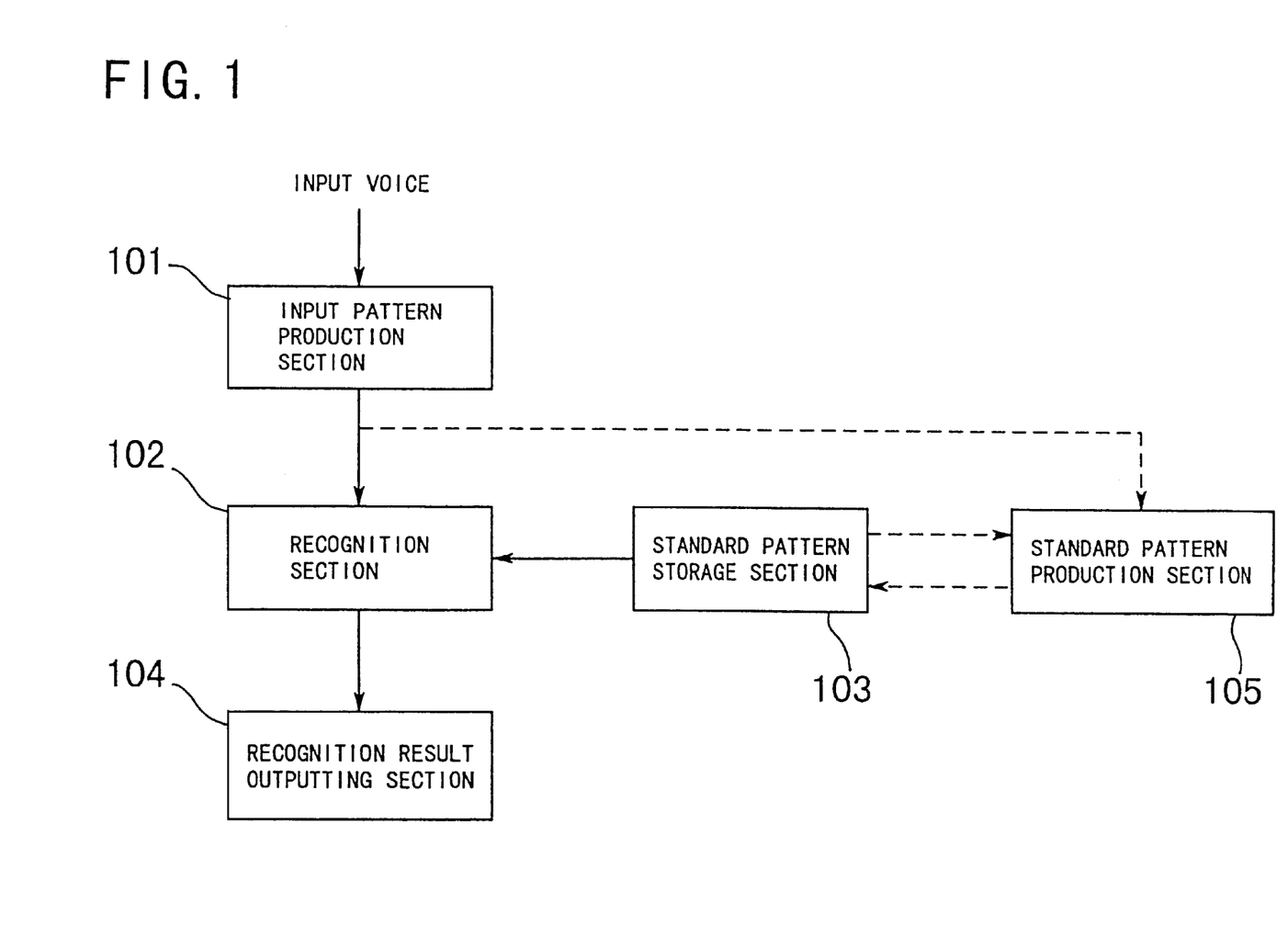
FIG. 1 is a block diagram showing a general construction of a speech recognition system.

In the following, a speech recognition system will be described with reference to FIG. 1 using a HMM as an example. Referring to FIG. 1, the speech recognition system shown includes a standard pattern storage section 103, an input pattern production section 101, a recognition section 102 and a recognition result outputting section 104.

Uttered voice of a speaker inputted to the speech recognition system is inputted to the input pattern production section 101, by which it is subject to such processes as analog to digital conversion and speech analysis so that it is converted into a time sequence of feature vectors for each unit called "frame" having a certain time length. The time sequence of feature vectors is called "input pattern".

The length of a frame is usually approximately 10 ms to 100 ms. A feature vector is obtained by extracting feature amounts of the voice spectrum at the point of time and normally have 10 to 100 dimensions.

HMMs are stored in the standard pattern storage section 103. A HMM is one of models of an information source of voice, and parameters of it can be learned using voice of a speaker. The HMM will be hereinafter described in detail in the description of the recognition section. The HMM is usually prepared for each recognition unit. To the description herein, a phoneme is used as an example to show the operation of the recognition unit.

For example, in a speaker-independent recognition system, speaker-independent HMMs learned using uttered voices of many speakers in advance are used as the HMMs of the standard pattern storage section 103.

Now, it is assumed that 1,000 words are used for an object of recognition. In short, a correct answer of a word is discriminated from within recognition candidates of 1,000 words. In order to recognize a word, HMMs of individual phonemes are connected to produce HMMs of recognition candidate words. For recognition of 1,000 words, word HMMs for 1,000 words are produced.

The recognition section 102 performs recognition of the input pattern using the word HMMS. A HMM is a model of an information source of voice, and in order to cope with various fluctuations of a speech pattern, a statistical idea is introduced in a description of a standard pattern. It is to be noted that, for detailed description of the HMM, reference is made to a publication written by Rabiner and Juang, "Fundamentals of Speech Recognition", Prentice Hall, pp. 321–389 (document 1).

A HMM of each phoneme is formed usually from one to ten states and state transitions between the states.

Usually, a start state and an end state are defined, and for each unit time, a symbol is outputted from each state and state transition that takes place.

Voice of each phoneme is represented as a time sequence of symbols outputted from a HMM within state transition from a start state to an end state. An output probability of a symbol is defined for each state, and a transition probability is defined for each transition between states.

The transition probability parameter is a parameter for representing a fluctuation in time of a voice pattern. The output probability parameter represents a fluctuation of voice of a voice pattern. By setting the probability of a start state to a certain value and successively multiplying the output probability and the transition probability for each state transition, a probability in which an utterance is generated from the model can be calculated.

On the contrary, when an utterance is observed, if it is assumed that the utterance is generated from a certain HMM, then an occurrence probability of it can be calculated.

Then, in speech recognition based on HMMs, HMMs are prepared for individual recognition candidates, and if an utterance is inputted, then an occurrence probability for each HMM is calculated, and that one of the HMMs which exhibits a maximum occurrence probability is determined as a generation source and the recognition candidate corresponding to the HMM is determined as a result of recognition.

For the output probability parameter, a discrete probability distribution representation and a continuous probability distribution representation are available, and here, the continuous probability representation is taken as an example. In the continuous probability distribution representation, a continuous mixture distribution, that is, a distribution wherein a plurality of Gaussian distributions are added with weights, is used. In the following example, the output probability has a continuous mixture probability distribution. Such parameters as the output probability parameters, the transition probability parameters and the weight coefficients for the plurality of Gaussian distribution are learned in advance by an algorithm called Baum-Welch algorithm applying learning uttered voice corresponding to a model.

In the following, processing upon word recognition will be described using numerical expressions, and then, learning of parameters will be described.

First, processing upon recognition will be described. An input pattern O represented as a time sequence of characteristic vectors is given as the following expression (1):

$$O = o_1, o_2, \ldots, o_t, \ldots, o_T \qquad (1)$$

where T is a total frame number of the input pattern. Recognition candidate words are represented by $W_1$, $W_2$, ..., $W_N$ where N is a recognition candidate word number.

Matching between a word HMM of each of the words $W_n$ and the input pattern O is performed in the following manner. In the following description, the suffix n is omitted unless required.

First, of a word HMM, the transition probability from a state j to another state i is represented by $a_{ji}$, the mixture weight of the output probability distribution is represented by $c_{im}$, the average vector of each factor Gaussian distribution is represented by $\mu_{im}$, and the covariance matrix is represented by $\Sigma_{im}$, where t is an input time, i and j are states of the HMM, and m is a mixture factor number. Recurrence formula calculation of the following expressions (2) and (3) regarding the forward probability $\alpha_t$ (i) is performed. This forward probability $\alpha_t$ (i) is a probability in which the state i is exhibited at the time t when a partial observation sequence $o_1, o_2, \ldots, o_t$ is outputted.

$$\alpha_1(i) = \pi_i, i = 1, \ldots, I \quad (2)$$

$$\alpha_{t+1}(i) = \sum_j \alpha_t(j) a_{ji} b_i(o_t) \quad i = 1, \ldots, I; t = 1, \ldots, T \quad (3)$$

where $\pi_i$ is a probability in which the initial state is i, and $b_i(o_t)$ is defined by the following expression (4):

$$b_i(o_t) = \sum_m \lambda_{im} N\left(o_t; \mu_{im}, \sum_{im}\right) \quad (4)$$

where $$N\left(o_t; \mu_{im}, \sum_{im}\right) = (2\pi)^{-K/2} |\sum_{im}|^{-1/2} \exp\left(-(\mu_{im} - o_t) \sum^{-1}(\mu_{im} - o_t)/2\right) \quad (5)$$

where K is a dimension number of an input frame and an average vector.

A likelihood of the word $W_n$ with respect to the input pattern is calculated by the following expression (6):

$$P^n(X) = \alpha_T(I) \quad (6)$$

where I is the last state. This processing is performed for each word model, and the recognition result word
Wñ
with respect to the input pattern X is given by the following expression (7):

$$\hat{n} = \text{argmax}_n P^n(X) \quad (7)$$

The recognition result word is sent to the recognition result outputting section 104. The recognition result outputting section 104 performs such processing as outputting of the recognition result on a screen or sending of a control command corresponding to the recognition result to another apparatus.

Subsequently, learning will be described. First, the following backward probability is introduced.

$$\beta_t(i) = \sum_{j=1}^{N} a_{ij} b_j(o_{t+1}) \beta(j), t = T-1, T-2, \cdots, 1, i = 1, \cdots, N \quad (9)$$

where $\beta_T$ (i) is the probability of a partial observation sequence from the time t+1 to the last end when the time t and the state i are given. Using the forward probability and the backward probability, the probability $\gamma_t$ (i) in which the state i is exhibited at the time t when the observation series O is given by the following expression (10):

$$\gamma_t(i) = \frac{\alpha_t(i)\beta_t(i)}{\sum_{i=1}^{I} \alpha_t(i)\beta_t(j)} \quad (10)$$

Further, the probability $\xi_t$ (i, j) in which the state i is exhibited at the time t and the state j is exhibited at the time t+1 is given by the following expression (11):

$$\xi_t(i, j) = \frac{\alpha_t(i) a_{ij} b_j(o_{t+1}) \beta_{t+1}(j)}{\sum_{i=1}^{I} \sum_{j=1}^{I} \alpha_t(i) a_{ij} b_j(o_{t+1}) \beta_{t+1}(j)} \quad (11)$$

Meanwhile, in the case of the continuous output probability distribution, the probability $\gamma'_t$ (i, k) in which the kth mixture factor of the state number i is exhibited at the time t is given by the following expression (12):

$$\gamma'_t(i, k) = \frac{\alpha_t(i)\beta_t(i)}{\sum_{i=1}^{I} \alpha_t(i)\beta_t(i)} \cdot \frac{c_{ik} N\left(o_t, \mu_{ik}, \sum_{ik}\right)}{\sum_{m=1}^{M} c_{im} N\left(o_t, \mu_{im}, \sum_{im}\right)} \quad (12)$$

Based on the foregoing calculation values, estimated values of $\pi$, a, c, $\mu$ and $\Sigma$ are given by the following expressions (13) to (17), respectively:

$$\overline{\pi}_i = \gamma_1(i) \quad (13)$$

$$\overline{a_{ij}} = \frac{\sum_{t=1}^{T-1} \xi_t^{ij}}{\sum_{t=1}^{T-1} \gamma_t^i} \quad (14)$$

$$\overline{c_{jk}} = \frac{\sum_{t=1}^{T} \gamma'_t(j, k)}{\sum_{t=1}^{T} \gamma_t(j)} \quad (15)$$

$$\overline{\mu_{jk}} = \frac{\sum_{t=1}^{T} \gamma'_t(j, k) o_t}{\sum_{t=1}^{T} \gamma'_t(j, k)} \quad (16)$$

$$\overline{\sum}_{jk} = \frac{\sum_{t=1}^{T} \gamma'_t(j, k)(o_t - \mu_{jk})(o_t - \mu_{jk})^t}{\sum_{t=1}^{T} \gamma'_t(j, k)} \quad (17)$$

In the Baum-Welch algorithm, it is repeated to update the parameters based on those estimated values and then estimate estimated values using the parameters. It has been proved that the probability of the observation series increases for each repeat.

The speech recognition apparatus is described above taking a HMM as an example.

While a case wherein a standard pattern is produced for each monophone unit as a speaker-independent HMM is described here, various other units may possibly be used such as a demi-syllable unit or a triphone unit.

The demi-syllable unit is a unit formed from a half when a syllable is cut into two, and the triphone unit is a phoneme unit formed from a phoneme when both of phonemes directly preceding and following the phoneme in uttered voice are taken into consideration. While, for example, "" ことば "" is represented as "kotoba", since phonemes preceding and following the first /o/ and the second /o/ are different from each other in that the first /o/ is preceded by /k/ and followed by /t/ and the second /o/ is preceded by /t/ and followed by /b/, the first /o/ and the second /o/ are regarded as different phonemes from each other and different standard patterns are produced for them.

An ordinary Japanese language presents 30 to 50 different monophone units, approximately 260 different demi-syllable units and 3,000 to 5,000 different triphone units. If a sufficient amount of uttered voice data for learning is available, then as the number of unit kinds increases, the recognition performance increases.

However, for learning of speaker-independent HMMs, uttered voice of many speakers is normally required, and uttered voice is not necessarily obtained by a sufficient amount.

In particular, where, for example, a demi-syllable is used as a recognition unit, each recognition unit is accompanied by four states, and each state is accompanied by two factor Gaussian distributions. However, in order to obtain a sufficient recognition performance, utterances of approximately 250 words from 85 speakers are required.

Where a comparatively small number of different units are used, a comparatively small amount of utterances for learning may be required, but where a comparatively large number of different units are used, a comparatively large amount of utterances for learning is required. Where the amount of utterance for learning is excessively small with respect to the number of units, such a phenomenon that parameter estimation becomes unstable or a parameter which has no corresponding learning data appears occurs, and the recognition performance is degraded.

As described above, in the conventional method, a large amount of speech data are used for learning of speaker-independent HMMs. However, it is the real condition that a criterion for responding, where a certain amount of speech data for learning is given, to a question of what is a suitable number of different kinds of recognition units or what amount is required for learning for a given number of different kinds of recognition units has not been proposed or realized until now.

Therefore, a technique like a trial and error method wherein a recognition evaluation experiment is conducted using test data varying the recognition unit and an optimum recognition unit is produced based on a result of the recognition evaluation experiment is used conventionally.

However, the conventional method requires preparation of a sufficient amount of speech data for testing in addition to speech data for learning and requires much calculation time for production of standard patterns and repetition of recognition experiments.

SUMMARY OF THE INVENTION

It is an object of the present invention to provide a standard pattern production system which makes it possible to automatically determine optimum recognition units for given uttered voice for learning using an information criterion.

In order to attain the object described above, according to an aspect of the present invention, there is provided a standard pattern production system for pattern recognition in which a standard pattern is employed, comprising input pattern production means for producing an input pattern from input data, standard pattern production means for producing a plurality of standard patterns for different categories using the input pattern, standard pattern selection means for selecting one of the plurality of standard patterns using an information criterion, and standard pattern storage means for storing the selected standard pattern.

According to another aspect of the present invention, there is provided a standard pattern production system for pattern recognition in which a standard pattern is employed, comprising input pattern production means for producing an input pattern from input data, standard pattern producing parameter production means for producing parameters for production of standard patterns of different categories, cluster set production means for dividing a set of all of the categories into a plurality of clusters to produce cluster sets, common standard pattern production means for producing a standard pattern common to all of the categories in each of the clusters, optimum cluster set selection means for selecting, from among the plurality of cluster sets produced by the cluster set production means and different from each other, an optimum cluster set using an information criterion, and standard pattern storage means for storing the common standard pattern of the optimum cluster set as standard patterns of the categories.

With the standard pattern production systems, by using an information criterion in learning of a standard pattern in pattern recognition, a recognition unit optimum in terms of an information criterion can be produced for given learning data.

Further, when the data amount is small, a small number of kinds of recognition units are produced, but when the data amount is large, a large number of kinds of recognition units are produced. Stable learning which eliminates the problem of overlearning or the problem that a category which does not include learning data arises can be performed, and a standard pattern having a high recognition performance can be produced.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

FIG. 1 shows a general construction of a speech recognition system in which a standard pattern production system to which the present invention is applied is incorporated. In particular, the standard pattern production system is applied as the standard pattern production section 105 shown in FIG. 1.

Figure 2:
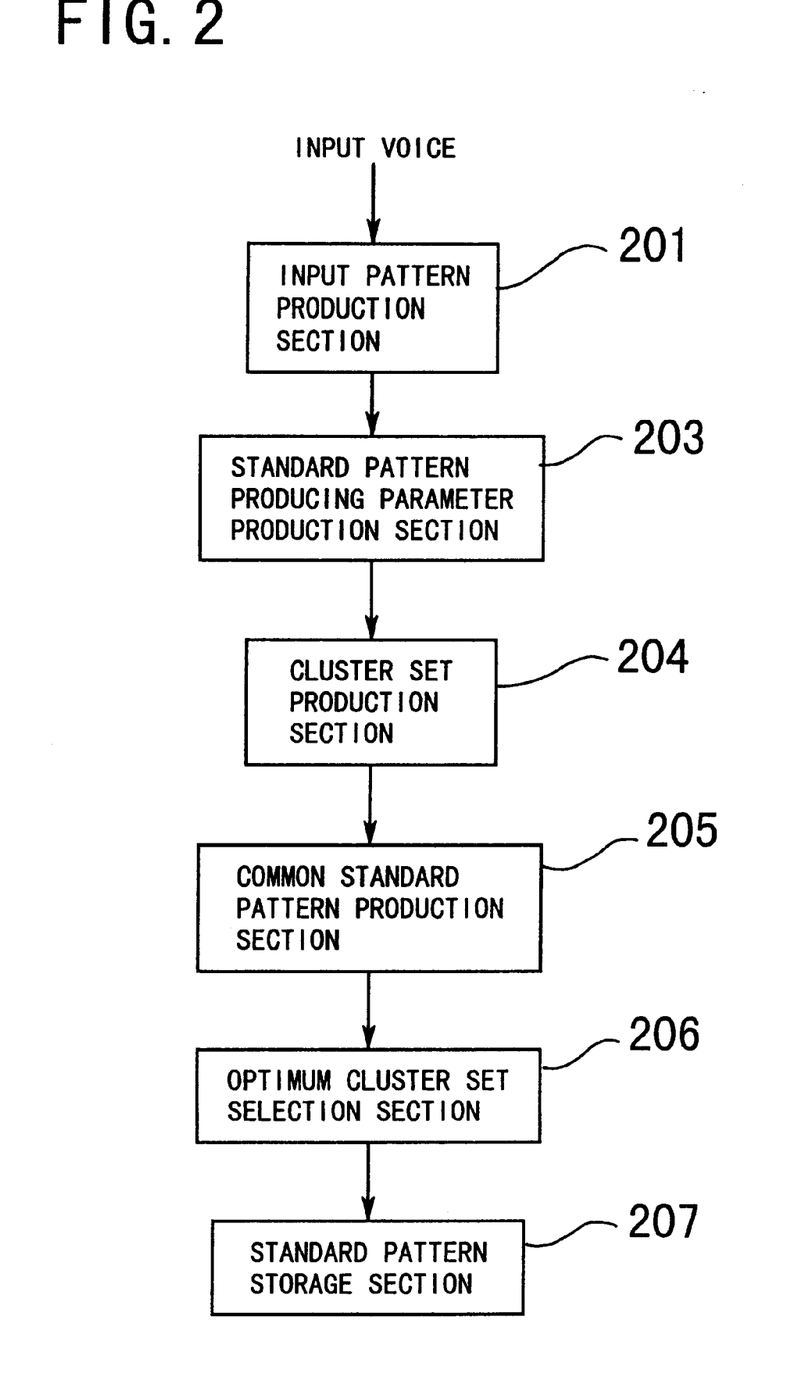
FIG. 2 is a block diagram showing a standard pattern production system to which the present invention is applied.

FIG. 2 shows a standard pattern production system to which the present invention is applied. Referring to FIG. 2, the pattern production system shown employs an information criterion and includes, for pattern recognition which employs a standard pattern, an input pattern production section 201 (which corresponds to the input pattern production section 101 of FIG. 1) for producing an input pattern from input data, a standard pattern producing parameter production section 203 for producing parameters for production of standard patterns of different categories, a cluster set production section 204 for dividing a set of all of the categories into a plurality of clusters to produce cluster sets, a common standard pattern production section 205 for producing a standard pattern common to all of the categories in each of the clusters, an optimum cluster set selection section 206 for selecting, from among the plurality of cluster sets produced by the cluster set production means and different from each other, an optimum cluster set using an information criterion, and a standard pattern storage section 207 (which corresponds to the standard pattern storage section 103 of FIG. 1) for storing the common standard pattern of the optimum cluster set as standard patterns of the categories.

The input pattern production section 201 holds an input pattern, and the standard pattern producing parameter production section 203 calculates and outputs parameters necessary to produce standard patterns of individual categories. The cluster set production section 204 divides a category set into cluster sets. The common standard pattern production section 205 calculates standard patterns of individual clusters of the cluster sets. The optimum cluster selection section 206 receives a plurality of cluster sets and common standard patterns and selects an optimum cluster using an information criterion. The standard pattern storage section 207 stores the common standard pattern of the optimum cluster set as a standard pattern for the individual categories.

Figure 3:
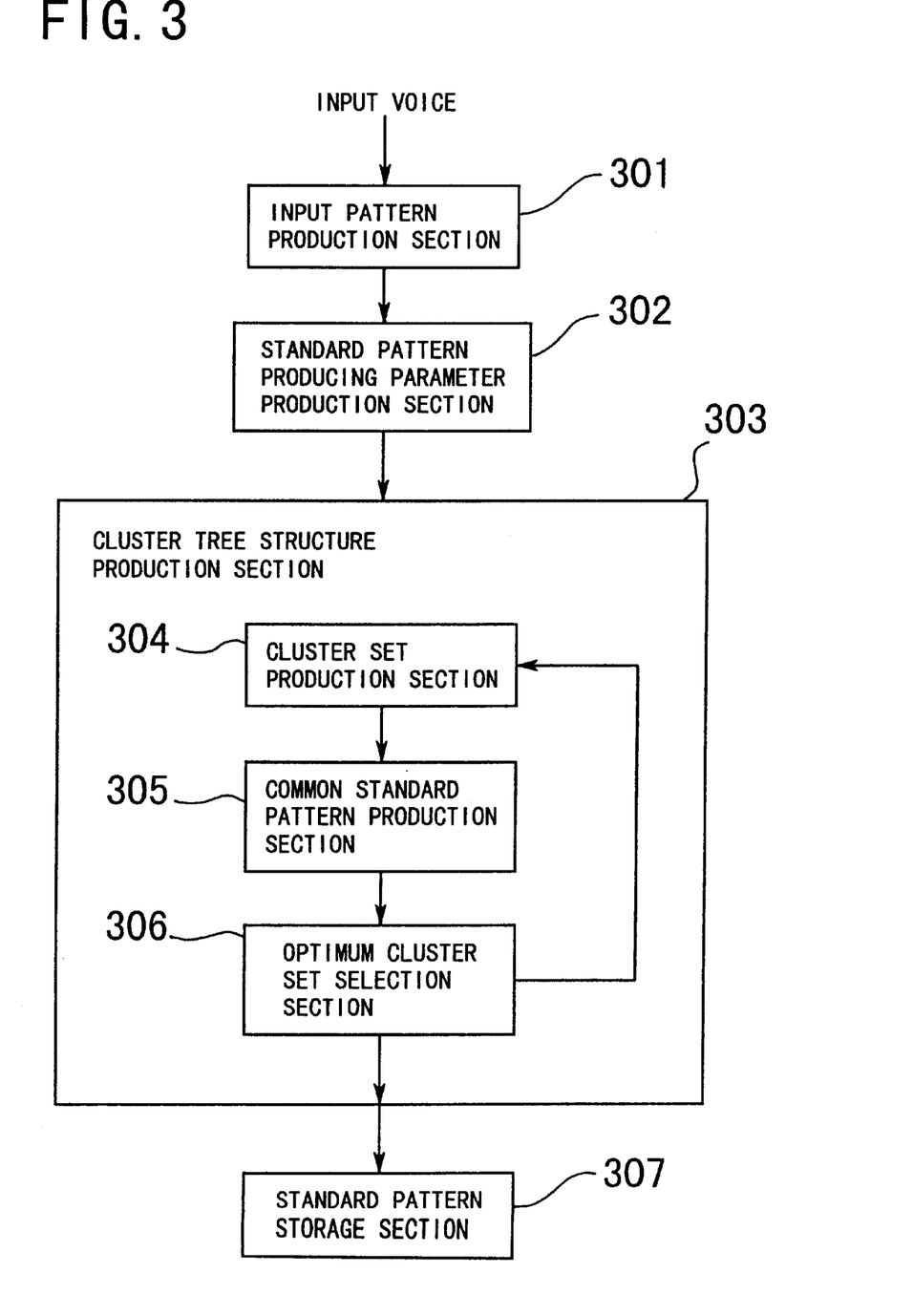
FIG. 3 is a block diagram showing another standard pattern production system to which the present invention is applied.

FIG. 3 shows another standard pattern production system to which the present invention is applied. Referring to FIG. 3, the standard pattern production system shown employs an information criterion and includes, for pattern recognition which employs a standard pattern, an input pattern production section 301, a standard pattern producing parameter production section 302, a cluster set production section 304, a common standard pattern production section 305, an optimum cluster set selection section 306 and a standard pattern storage section 307 which are similar to the input pattern production section 201, standard pattern producing parameter production section 203, cluster set production section 204, common standard pattern production section 205, optimum cluster set selection section 206 and standard pattern storage section 207 of the standard pattern production system of FIG. 2, respectively. The present standard pattern production system further includes a cluster tree structure production section 303 for producing a tree structure of clusters to produce a plurality of cluster sets.

The input pattern production section 301 holds an input pattern. The standard pattern producing parameter production section 302 calculates and outputs parameters necessary to produce standard patterns of individual categories. The cluster production section 304 divides a category set to produce tree structure cluster sets. The common standard pattern production section 305 calculates standard patterns of the tree structure of the clusters of the cluster sets. The optimum cluster selection section 306 receives a plurality of cluster sets and common standard patterns and selects an optimum cluster using an information criterion. The standard pattern storage section 307 stores the common standard pattern of the optimum cluster set as a standard pattern for the individual categories.

Further, in both of the standard pattern production systems of the present invention described above, the standard pattern selection section preferably uses a minimum description length principle.

Furthermore, in both of the standard pattern production systems, the standard pattern selection means preferably uses an AIC proposed by Hirotsugu Akaike as the information criterion. For the AIC, reference is had to, for example, a document by H. Akaike, "A New-Look at the Statistical Mode Identification", *IEEE, Trans. on Automatic Control*, AC-19-6, 1974, pp. 716–723, or another document by Hirotsugu Akaike, "What Is an Information Criterion", *Mathematical Science*, Sho 51-3, 1976, pp. 5–11.

Preferably, voice is used as the input and a phonetic decision tree is used as the tree structure of clusters.

Preferably, voice is used as the input, and the tree structure of clusters is produced using hierarchical clustering which employs a distance in an acoustic space from a standard pattern.

Also, preferably a hidden Markov model (HMM) is used as the standard pattern.

Pattern production by the standard pattern production system according to the present invention will be described with particular reference to FIG. 2. Here, particularly for a HMM, a left-to-right HMM is taken as an example.

The left-to-right HMM is a model wherein the state number of the system increases as time passes. In short, the left-to-right HMM has a characteristic that the state of the system progresses from the right to the left. Further, a case wherein, as a recognition unit with which the number of kinds of recognition units is small, a monophone unit is presumed, and as a recognition unit with which the number of kinds of recognition unit is large, a triphone unit is presumed will be described. Further, for the information criterion, the description length minimum principle is used.

First, learning of phoneme HMMs and triphone HMMs is performed simultaneously. In particular, individual words are first described in a symbol train of triphone recognition units, and based on the description, triphone HMMs are learned using voice data.

Parameters of a phoneme HMM are learned as a tie of parameters of a triphone HMM. The "tie" indicates that parameters are commonly used between different recognition units, states or distributions. For example, the tie $a_{i,j}$ between the transition probability from a state $i_1$ to another state j and the transition probability from a further state $i_2$ to the state j is given by the following expression (18):

$$\overline{a_{i'j}} = \frac{\sum_{t=1}^{T}(\xi_t(i1, j) + \xi_t(i2, j))}{\sum_{t=1}^{T}(\gamma_t(i1) + \gamma_t(i2))} \quad (18)$$

Meanwhile, the tie $\mu_{ik}$ between an average vector of the state $i_1$ and a mixture factor $k_1$ and another average vector of the state $i_2$ and another mixture factor $k_2$ is given by the following expression (19);

$$\mu_{ik} = \frac{\sum_{t=1}^{T} \gamma'_t(i_1, k)o_t + \gamma'_t(i_2, k)o_t}{\sum_{t=1}^{T} \gamma'_t(i_1, k) + \gamma'_t(i_2, k)} \quad (19)$$

In this manner, the parameter of a phoneme HMM can be calculated as a form of a weighted average of parameters of a triphone HMM. The foregoing processing corresponds to the standard pattern parameter production section 203 of FIG. 2.

Thereafter, the monophone units are successively divided using information of preceding and following phonemes. Here, each unit after the division is called cluster. In particular, a monophone unit is formed from a plurality of clusters.

A set composed of a plurality of such clusters is called "cluster set". The division is performed such that a monophone unit is first divided into two and each unit obtained by the division is further divided into two and such operations are repeated. The repetition is stopped suitably. Where the monophone units are divided most finely, recognition units obtained by the division are equivalent to triphone units.

As a criterion for the division, for example, a character called distinctive feature of preceding and following phonemes is used. For example, in dividing a monophone unit "a" corresponding to the phoneme /a/, it is divided into two depending upon the condition whether or not the preceding phoneme is a plosive (for example, /b/, /d/, /g/, /p/, /t/ or /k/) or whether the following phoneme is voiced (for example, /b/, /m/ or /z/) or unvoiced (for example, /s/ or /k/).

While criteria for division are prepared in advance, generally the number of kinds of them is several tens to several hundreds. It is to be noted that, here, as the object of division, not a monophone unit but a state of a monophone unit is taken. In other words, for a phoneme, different dividing methods are used for different states to which the phoneme belongs. For example, the first state and the second state of a monophone unit are divided in different ways from each other. By this manner of division, finer division can be performed and higher augmentation in performance can be anticipated than where an entire monophone unit is divided.

Further, it is assumed that the probability distributions of the individual states are single Gaussian distributions, and a same transition probability is used for both of a monophone unit and a triphone unit corresponding to a same phoneme.

The processing described above corresponds to the processing of the cluster set production section 204 of FIG. 2. Various dividing methods are available. In other words, the number of kinds of possible cluster sets is very large. Consequently, a large number of kinds of cluster sets are produced.

Then, a standard pattern is produced for each of the clusters in the cluster sets. This standard pattern is learned as a tie of standard patterns of a category which belongs to this cluster. The production method of it is described hereinabove. This corresponds to the common standard pattern production section 205 of FIG. 2.

Thereafter, an optimum cluster set for the input data is determined from among the many different cluster sets using the minimum description length principle.

It has been proved from recent investigations for an information theory and a computational learning theory that the minimum description length (MDL) principle is effective for a problem of selection of an optimum probability model from data. For the minimum description length principle, reference is had to description of, for example, a publication by Han Tesun and Kingo Kobayashi, "Applied Mathematics 11 of the Iwanami Lecture, Mathematics of Information and Coding", Iwanami Book Store, 1994, pp. 249–275 (hereinafter referred to as document 2).

The MDL principle maintains that one of probability models i=1, . . . , M which minimizes the description length of data $X^N = X_1, \ldots, X_N$ is an optimum model. The description length is represented by the following expression (20):

$$1_R^{(i)} = -\log P^n_{\hat{\theta}(i)}(x^N) + \frac{k^{(i)}}{2}\log N + \log M \quad (20)$$

where $k^{(i)}$ is the order number of the models i, and $\hat{\theta}$ is a most likely estimation amount of the parameter $\theta^{(i)} = (\theta_1^{(i)}, \ldots, \theta_k(i)^{(i)})$ of the models i from the data $X^N$.

The first term on the right side of the expression (20) above is a logarithmic likelihood of the data with the sign reversed, and the second term is an amount representative of a complexity of the model.

As the model becomes more complex, the first term decreases while the second term increases. In this manner, a trade-off is present between them, and a model having a certain suitable complexity is selected as an optimum model.

Now, using this minimum description length principle, the description length for a certain cluster set U is calculated in the following manner.

Now, the clusters of factors of the cluster set U are represented by $S_1, \ldots, S_M$ where M is a number of factor clusters of U. Now, the likelihood $L(S_m)$ of the data in the state $S_m$ can be approximated as represented by the following expressions (21) and (22):

$$L(S_m) = \sum_{t=1}^{T}\sum_{s \in Sm} \log\left(N\left(o_t, \mu_{Sm}, \sum_{Sm}\right)\right)\gamma_t(s) \quad (21)$$

$$= -\frac{1}{2}\left(\log\left((2\pi)^K |\sum|\right) + K\right)\Gamma(S_m) \quad (22)$$

where $$\Gamma(S_m) = \sum_{t=1}^{T}\sum_{s \in Sm}\gamma_t(s) \quad (23)$$

s is a state of all triphone units included in the cluster $S_m$, K is a dimension number of an average vector and a dispersion used as a common standard pattern, and $\mu s_m$ and $\Sigma s_m$ are an average vector and a dispersion of a common standard pattern of the cluster $S_m$, respectively.

Where this result is used, the description length l(U) for the cluster set U can be presented as given by the following expressions (24) and (25):

$$1(U) = \sum_{m=1}^{M} L(S_m) + \frac{1}{2}2KM\log\sum_{m=1}^{M}\Gamma(S_m) \quad (24)$$

$$= \frac{1}{2}\sum_{m=1}^{M}\Gamma(S_m)\log(|\sum(S_m)|) + KM\log V + \quad (25)$$

$$\frac{K}{2}(1 + \log(2\pi))V$$

where $$V = \sum_{m=1}^{M}\Gamma(S_m) \quad (26)$$

The value V obtained is an amount corresponding to a frame number of all data corresponding to the cluster set U and does not rely upon the method of division.

For all possible cluster sets, the description length l(U) is calculated, and a cluster se t U which has the lowest l(U) is selected. The foregoing processing corresponds to the processing of the optimum cluster set selection section 206 of FIG. 2.

Then, a standard pattern is produced using the common standard pattern of the clusters of the optimum cluster set.

As described above, the clusters which form the selected optimum cluster set has a single common standard pattern, that is, an average vector and a dispersion. They are divided with an average value of all states which belong to the cluster. Then, they are thereafter stored as standard patterns of triphone recognition units. The foregoing corresponds to the standard pattern storage section 207 of FIG. 2.

By the way, the number of kinds of possible division, that is, the number of cluster sets U, is usually very large.

Therefore, in the standard pattern production system of FIG. 3, the amount of calculation is reduced by producing a tree structure of clusters (refer to the tree structure cluster production section 303). This will be described in detail below.

Description is given in regard to a single phoneme p. First, a node for the phoneme p is produced. Now, this node will be referred to as route node. A common standard pattern of a route node is obtained when all triphone units corresponding to this phoneme are tied into a tied relationship.

Division conditions for the phoneme p are presented by reference symbols $Q_1, \ldots, Q_R$ where R is a number of all conditions. Division is performed for all those division conditions to check a variation of the description length. Where the original cluster is represented by $S_\theta$ and the clusters obtained by dividing it into two are represented by $S_1$ and $S_2$, the variation $\Delta$ in description length is represented by the following expressions (27) and (28):

$$\Delta = 1(S_1, S_2) - 1(S_0) \quad (27)$$

$$= \frac{1}{2}\left(\Gamma(S_1)\log|\sum_{S_1}| + \Gamma(S_2)\log|\sum_{S_2}| - \Gamma(S_0)\log|\sum_{S_0}|\right) + \quad (28)$$

$$K\log V$$

A division condition with which the variation $\Delta$ in description length exhibits a minimum value is detected. Then, if the variation $\Delta<0$ then, then division into two is performed, but if the variation $\Delta>0$, then no division is performed.

When division is to be performed, for each of the nodes $S_1$ and $S_2$ obtained by the division, the description length of each division is calculated in a similar manner as described above. Then, if the description length decreases, then division is performed with a division condition which exhibits a maximum decrease amount. The foregoing processing is repeated. As a result, the history of the divisions is represented by a tree structure of a binary tree.

Upon mounting into a system, the processing described above can be performed recursively to detect an optimum division in terms of the information criterion.

Also the calculation amount is reduced remarkably. The foregoing is description of the standard pattern production section 303 which employs the cluster tree structure production means shown in FIG. 3.

While, in the embodiment described above, a case wherein the minimum description length principle is used as an information criterion is described above, the Akaike information criteria (Information Criteria; called "AIC") may be used, that is, the most likelihood estimation amount $X^N$ used in the expression (20) or the like may be used for the most likelihood of AIC=$-2\log_e$ (most likelihood)+2 (parameter number) may be used. In this instance, in model determination, parameters of various models are estimated using the most likelihood method, and one of the parameters with which the AIC exhibits a minimum value is selected as the best model. If two models are suitable to approximately equal degrees, then since the first term of the AIC is equal, one of the models with which the number of parameters of the second term is smaller is selected. Or, the standard pattern production system can be applied readily also where some other like information criteria than the AIC are used.

Further, while a method of producing a tree structure using a phonological rule (distinctive feature) is described as a method of producing a tree structure, a tree structure may otherwise be produced using distances on an acoustic space.

Having now fully described the invention, it will be apparent to one of ordinary skill in the art that many changes and modifications can be made thereto without departing from the spirit and scope of the invention as set forth herein.

What is claimed is:

1. A standard speech pattern production system for speech pattern recognition in which a standard pattern is employed, comprising:

input pattern production means for producing an input pattern from input data;

standard pattern producing parameter production means for producing parameters for production of standard patterns of different categories;

cluster set production means for dividing a set of all of the categories into a plurality of clusters to produce cluster sets;

common standard pattern production means for producing a standard pattern common to all of the categories in each of the clusters;

optimum cluster set selection means for selecting, from among the plurality of cluster sets produced by said cluster set production means and different from each other, an optimum cluster set using an information criterion; and standard pattern storage means for storing the common standard pattern of the optimum cluster set as standard patterns of the categories.

2. A standard speech pattern production system as claimed in claim 1, wherein said common standard pattern production means uses a minimum description length principle to select a standard pattern from among the plurality of standard patterns using the information criterion.

3. A standard speech pattern production system as claimed in claim 1, wherein said common standard pattern production means uses an AIC criterion as the information criterion when a standard pattern is to be selected from among the plurality of standard patterns using the information criterion.

4. A standard speech pattern production system as claimed in claim 1, further comprising cluster tree structure production means for producing a tree structure of clusters to produce a plurality of cluster sets.

5. A standard speech pattern production system as claimed in claim 4, wherein said common standard pattern production means uses a minimum description length principle to select a standard pattern from among the plurality of standard patterns using the information criterion.

6. A standard speech pattern production system as claimed in claim 4, wherein said common standard pattern production means uses an AIC criterion as the information criterion when a standard pattern is to be selected from among the plurality of standard patterns using the information criterion.

7. A standard speech pattern production system as claimed in claim 4, wherein voice is used as the input and a phonetic decision tree is used as the tree structure of clusters.

8. A standard speech pattern production system as claimed in claim 4, wherein voice is used as the input, and the tree structure of clusters is produced using hierarchical clustering which employs a distance in an acoustic space from a standard pattern.

9. A standard speech pattern production system as claimed in claim 4, wherein a hidden Markov model is used as the standard pattern.

10. A speech recognition system, comprising the standard speech pattern production system as set forth in claim 1, said speech recognition system using voice as the standard pattern, said standard pattern storage means of said standard pattern production system being referred to to effect recognition of the input pattern so that a result of the recognition is outputted.

* * * * *